(12) United States Patent
Heigl et al.

(10) Patent No.: US 7,839,403 B2
(45) Date of Patent: Nov. 23, 2010

(54) SIMULTANEOUS GENERATION OF DIFFERENT DATA SETS FROM A SINGLE ACQUISITION RUN AND DUAL RENDERING OF IMAGES

(75) Inventors: Benno Heigl, Coburg (DE); Michael Martens, Weisendorf (DE); Thomas Brunner, Nürnberg (DE); Peter Durlak, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 925 days.

(21) Appl. No.: 11/311,757

(22) Filed: Dec. 19, 2005

(65) Prior Publication Data

US 2007/0140537 A1 Jun. 21, 2007

(51) Int. Cl.
*G06T 15/30* (2006.01)
(52) U.S. Cl. .................... 345/423; 382/131; 382/132
(58) Field of Classification Search .............. 345/423; 382/131–132
See application file for complete search history.

(56) References Cited

U.S. PATENT DOCUMENTS

| | | | | |
|---|---|---|---|---|
| 5,720,291 | A * | 2/1998 | Schwartz | 600/456 |
| 5,832,134 | A * | 11/1998 | Avinash et al. | 382/257 |
| 6,195,579 | B1 * | 2/2001 | Carroll et al. | 600/420 |
| 6,662,038 | B2 * | 12/2003 | Prince | 600/420 |
| 7,024,027 | B1 * | 4/2006 | Suri et al. | 382/130 |
| 2003/0031351 | A1 * | 2/2003 | Yim | 382/130 |
| 2004/0081340 | A1 * | 4/2004 | Hashimoto | 382/128 |
| 2005/0135557 | A1 * | 6/2005 | Hermann et al. | 378/21 |
| 2006/0184006 | A1 * | 8/2006 | Chen et al. | 600/416 |
| 2007/0008317 | A1 * | 1/2007 | Lundstrom | 345/424 |
| 2007/0127791 | A1 * | 6/2007 | Ernvik et al. | 382/128 |

OTHER PUBLICATIONS

Syngo InSpace 3D Siemens Medical.
DynaCT—Siemens Medical.

* cited by examiner

*Primary Examiner*—Xiao M Wu
*Assistant Examiner*—Maurice McDowell, Jr.
(74) *Attorney, Agent, or Firm*—Schiff Hardin LLP (57) ABSTRACT

In a method and system for dual rendering of images, a first volume image is reconstructed with a computer. A second volume image is reconstructed with the computer. The first reconstructed volume image is adjusted for a desired rendering. The second volume image is adjusted for desired rendering. A dual rendering of the first and second volume images is displayed where one of the volume images can be seen through the other volume image. Also, a simultaneous generation of different types of reconstructed data sets out of a single acquisition run for those data sets corresponding to the dual rendered images is provided for. The diagnostic questions is shown in FIG. 5.

6 Claims, 6 Drawing Sheets

SIMULTANEOUS GENERATION OF DIFFERENT DATA SETS FROM A SINGLE ACQUISITION RUN AND DUAL RENDERING OF IMAGES

BACKGROUND

The 3-D reconstruction of volume data from 2-D x-ray projections has become important in many fields. In the medical imaging field, the reconstruction of vessel structures is especially helpful for treating aneurysms or stenoses in interventional angiography, for example.

Figure 1:
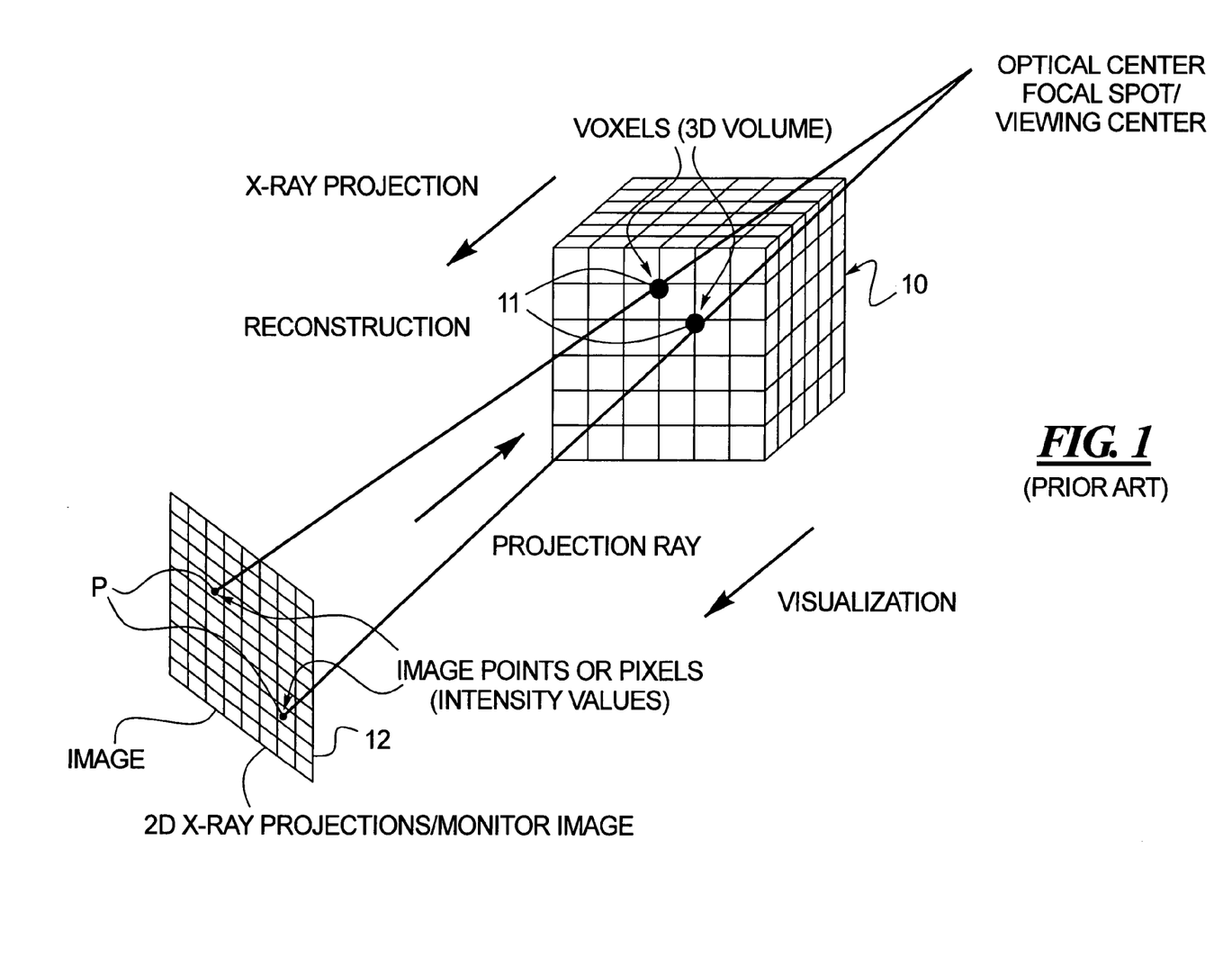
FIG. 1 shows a chart of techniques explaining 3-D reconstruction of volume data from 2-D x-ray projections with respect to a volume/object.

A brief explanation of 3-D reconstruction of volume data from 2-D x-ray projections can be better understood by reference to prior art FIG. 1. In the x-ray process, a real-world object (the cube 10) is x-rayed. 2-D x-ray projection images are generated. On a computer, these projections are made up of discrete "pixels." For the reconstruction process, from those 2-D x-ray projections a 3-D data volume (the cube 10, which is now a computer object) is calculated. On a computer, this data cube is discrete, made up of "voxels". In the volume rendering process, the data volume is viewed on a 2-D computer monitor, i.e. one generates 2-D views 12 of the 3-D data volume 10.

The volume rendering process takes into account the following attributes which the voxels have:

1. Most important: the gray value (–CT value–Hounsfield value). Something that should be related to the original x-ray absorption of the object at this very spot.

2. Different gray values contribute according to the transfer function. Voxels having gray values where the transfer function is zero do not contribute to the rendering.

3. Opacity: Example—If there is a voxel with 100% opacity one will not see what is behind. The other way around: if the opacity is low, one can generate a glass-like impression.

4. Light effects, which are modeled with virtual light sources and are based on gray value gradients, etc.

Figure 2:
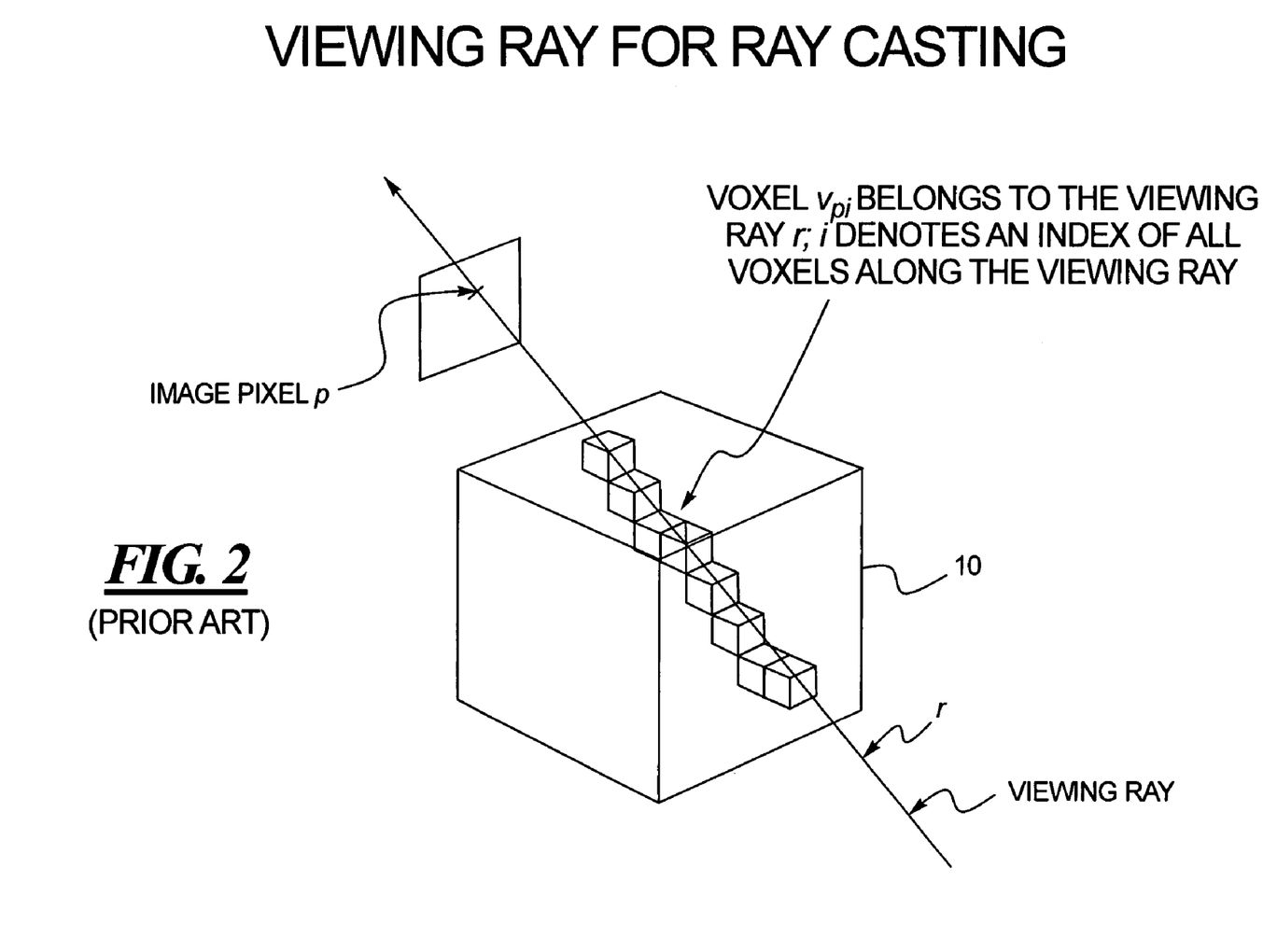
FIG. 2 shows a viewing ray for ray casting through the volume/object 10 of FIG. 1 for explaining an algorithm for ray casting.

Prior art FIG. 2 shows a viewing ray for ray casting through volume/object 10. The prior art algorithm for ray casting using a single volume is as follows:

for each image pixel $\rho$
   initial color of pixel to black: $c_\rho := 0$
   for each voxel $v_{\rho i}$ belonging to pixel $\rho$
      calculate the color value $c(v_{\rho i})$ originating from voxel $v_{\rho i}$
      determining opacity $o(v_{\rho i})$ within a range 0 . . . 1

$$c_\rho := c_\rho(1-o(v_{\rho i})) + c(v_{\rho i})o(v_{\rho i})$$

end
end

Figure 3:
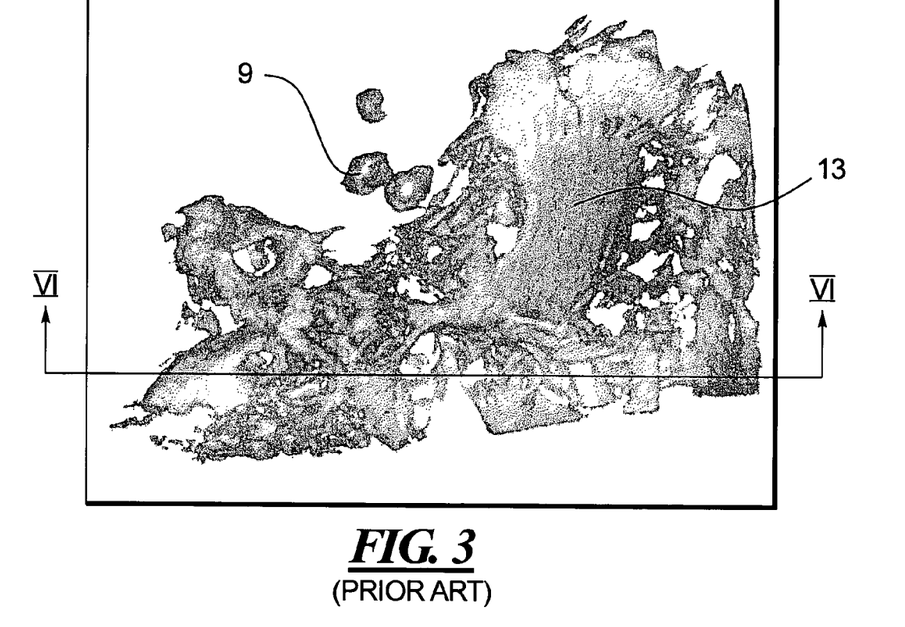
FIG. 3 shows a native reconstruction image from a mask run-bones and three coil baskets in aneurysms are visible-vessels are not visible.

For reconstructing vessel structures many x-ray images are taken from different positions around the object (e.g. a patient's head) and in two phases. During the first phase no contrast agent is applied whereas in the second phase contrast agent is used for making the vessels visible. The images from the first run (without contrast agent) are called mask images; and the images of the second run (with contrast agent being injected) are called fill images. The corresponding mask reconstruction for the mask images are shown in prior art FIG. 3 and the corresponding fill reconstruction for the fill images is shown in prior art FIG. 4.

Four possible ways of reconstructing images using the Siemens, AG prior art product (InSpace 3D, DynaCT), are:

From these images a volume data set can be reconstructed using only mask images. The resulting 3-D volume will show both bone 13 and metal implant structures 9 (e.g. coils in aneurysms, stents, wires). That reconstruction is called "native mask" (See 2-D FIG. 3).

From these images a volume data set can be reconstructed using only fill images. The resulting 3-D volume will show both bone 13, metal structures 9, and vessels 14. That reconstruction is called "native fill" (See 2-D FIG. 4).

A third possibility is to subtract the information of fill and mask images. In this case only the vessel structures 14 are visible. That reconstruction is called "subtracted" (See 2-D FIG. 5).

Figure 6:
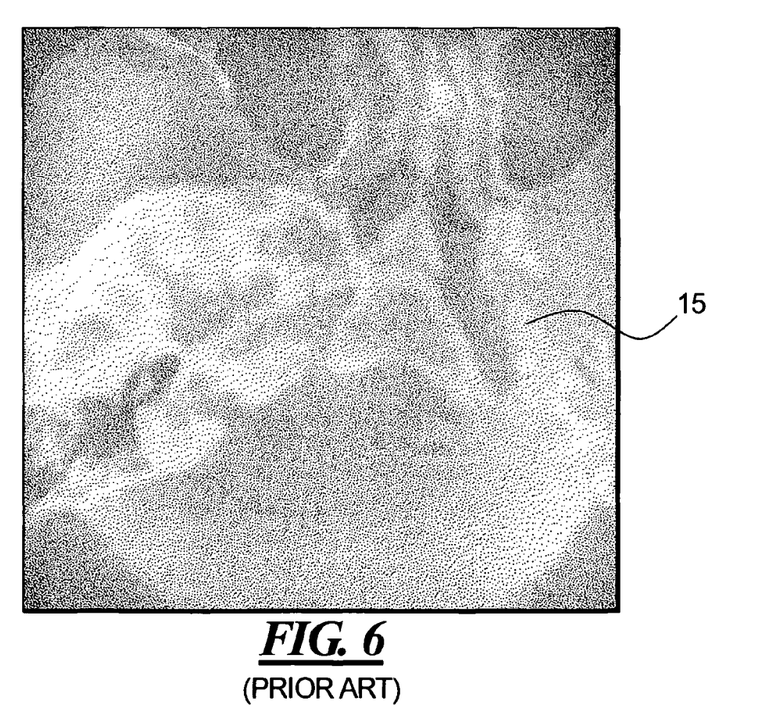
FIG. 6 shows an image of an enhanced data set.

If the slice thickness is increased and a softer reconstruction kernel (a mathematical formula to transform data such as for different spatial resolution or contrast) is used, reconstructions with a better low contrast resolution can be achieved at the expense of spatial resolution. This type of reconstruction is usually only applied from a mask run in a native way, and is called "enhanced" (See 2-D FIG. 6 showing enhanced bone 15). The enhanced reconstruction is available with the Siemens AG product Dyna CT. This reconstruction sacrifices resolution but gains gray value resolution. This enhances seeing a low contrast object like a hemorrhage.

Figure 4:
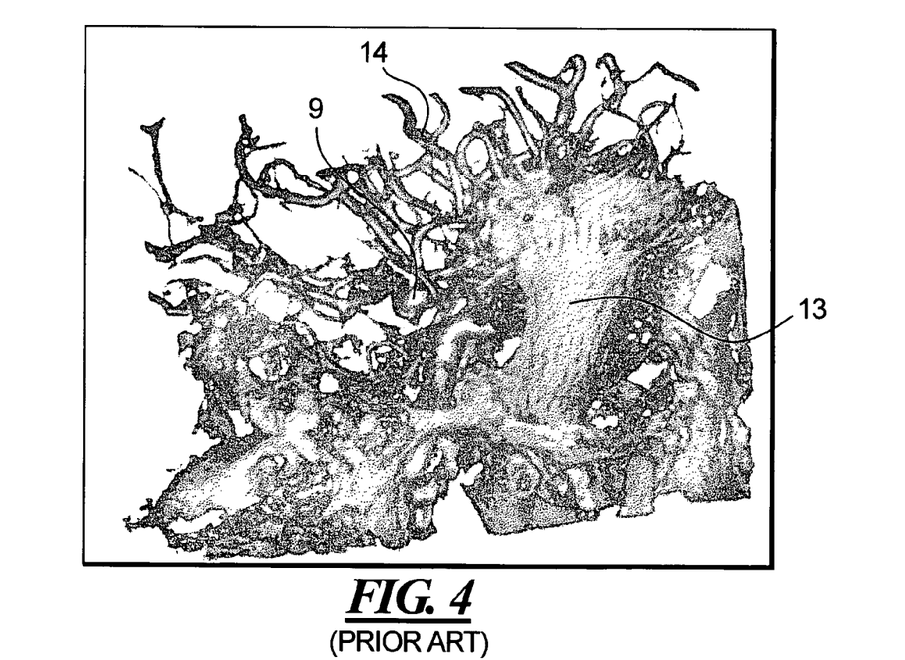
FIG. 4 shows a native reconstruction image from a fill run-bones and three coil baskets (or at least one of them) in aneurysms are visible-vessels are also visible.
Figure 5:
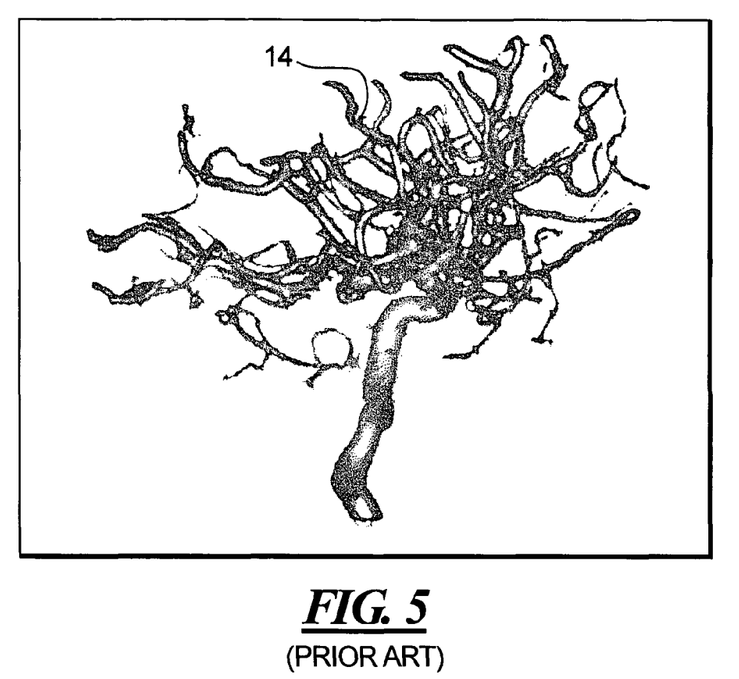
FIG. 5 shows a subtracted reconstruction image from the mask and the fill run-only vessels are visible.

When calculating the subtracted reconstruction described above as the third possibility, the method is done in three phases in the prior art. First, the reconstruction from the mask images is done. Secondly, the fill images is done. The reconstruction from the mask images is shown by the native mask reconstruction mentioned above in FIG. 3. The reconstruction from the fill images is shown by the native fill reconstruction explained above in FIG. 4. Thirdly, the subtracted reconstruction is finally computed by subtracting the native mask from the native fill reconstruction as shown in FIG. 5.

The reconstruction from the mask images as well as the reconstruction from the fill images in the prior art are stored as separate 3-D data sets for later use during visualization. The final subtracted result also is stored as a 3-D data set.

In the prior art the enhanced reconstruction is computed either with a modified reconstruction kernel starting from the same projection images as for the other reconstructions or by applying appropriate filter operations on the previously computed native reconstruction, as described above.

In the prior art, with the storage of all these data sets there exist several possibilities for visualization, which show vessel, bone, and low-contrast structures separately or in combination:

The subtracted reconstruction is used for hiding occluding bones (FIG. 5);
The fill reconstruction is used to show both, bones and vessels (FIG. 4);
The mask reconstruction is used to show bones and other objects like coils and stents (FIG. 3); and
The enhanced reconstruction is used to show low-contrast regions like tumors or bleedings (FIG. 6).

For visualization, the 3-D data sets must be loaded into an application (InSpace 3D, Dyna CT) that is capable of producing 2-D projections or sections of the 3-D volume (e.g. Volume Rendering Technique (VRT), a way to visualize medical volume data, Maximum Intensity Projection (MIP)—good for showing bones, Multi-planar Reformatting (MPR) used for visualizing arbitrary plane slices through a cube in any direction, etc.). If the user is interested in vessel structures, he usually visualizes a subtracted reconstruction which has the advantage that no bone structures hide vessels. However, a big disadvantage is that the missing bone structures prevent from providing orientation help. If the user is interested in bone structures the user visualizes the native reconstruction.

If the user is interested in tumors, bleedings or other low-contrast objects, he uses the enhanced reconstruction for visualization.

A problem in the above prior art is the simultaneous usage and visualization of the information contained in these data sets. Prior art techniques are known for attempting to solve this problem. For visualizing both bone and vessel structures the user previously had two possibilities which also can be combined:

The user edits the volume such that bone structures that would hide vessel structures are removed manually. This approach is very time consuming and requires a lot of experience.

The user tries to separate the bones from the vessels by applying different visualization parameters (e.g. color, transparency) to different ranges of x-ray density (or gray values). This approach is also very time consuming, and usually no clear separation is possible as the density values of bones and vessels overlap.

In many cases the above approaches do not lead to a satisfactory result because either bony structures are spatially very close to vessel structures or the density of vessels does not differ much from the density of bones.

The visualization of enhanced reconstructions has not been used in the prior art in combination with native or subtracted reconstructions.

It is also known to invoke each type of reconstruction separately. It was not previously known to simultaneously generate different types of reconstructed data sets out of a single acquisition run.

SUMMARY

In a method and system for dual rendering of images, a first volume image is reconstructed with a computer. A second volume image is reconstructed with the computer. The first reconstructed volume image is adjusted for a desired rendering. The second volume image is adjusted for desired rendering. A dual rendering of the first and second volume images is displayed where one of the volume images can be seen through the other volume image. Also, a simultaneous generation of different types of reconstructed data sets out of a single acquisition run where those data sets correspond to the dual rendered images is provided for.

DESCRIPTION OF THE PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

Figure 7:
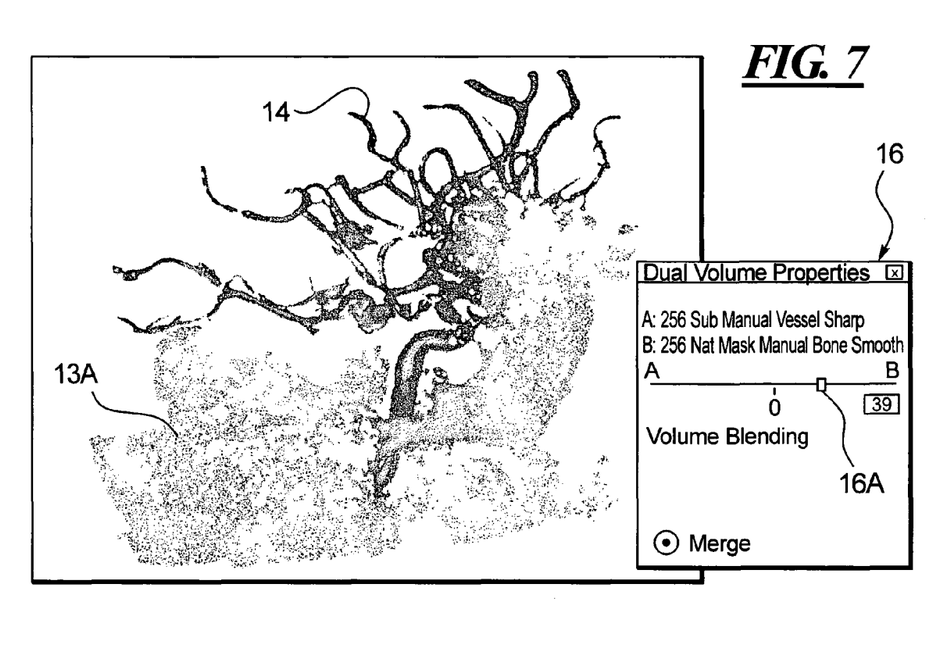
FIG. 7 shows, according to the preferred embodiment, a dual volume rendering image display of native mask (bones and metal) and sub-volumes (vessels) where bones are more faded in with a percentage slider.
Figure 8:
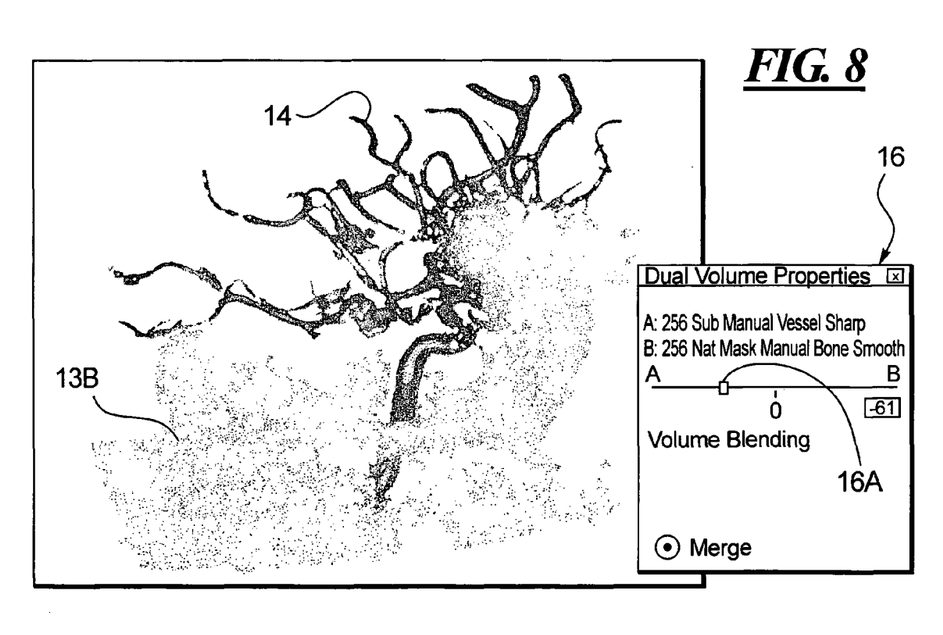
FIG. 8 shows, according to the preferred embodiment, a dual volume rendering image display of native mask (bones and metal) and sub-volumes (vessels) where bones are more faded out with the percentage slider.

With the improvement of the dual rendering of the preferred embodiment, the following additional visualizations are possible:

As shown in FIGS. 7 and 8, the subtracted reconstruction is used in combination with the mask reconstruction. In this case for each data set another viewing setting is chosen (e.g. different color and different structures are covered in different data sets. By interactively modifying the transparency of the mask reconstruction with the fading tool 16 with slider 16A, bone structures 13A (FIG. 7) and 13B (FIG. 8) are faded in or out in real-time relative to vessels 14. Alternatively, reconstruction is used to see bones, coils, and vessels. Then the mask reconstruction may be subtracted in order to remove bones and/or coils by The enhanced reconstruction (FIG. 6) may be used in combination with the subtracted reconstruction as shown in FIG. 5, e.g. for showing the position of tumors or bleedings in relation to vessel structures. The vessel structures 14 can be visualized as VRT or MIP and the enhanced reconstruction is overlaid as described above or as an MPR plane 15A as shown in FIG. 9.

If the user is interested in an exact reconstruction of bones and also in low-contrast regions the user may simultaneously visualize the native with the enhanced reconstruction. For visualization the method mentioned in the last item can be applied again.

With the preferred embodiment, during one reconstruction process three data sets can be generated, be saved to the database, and be loaded into the dual (multiple) volume rendering application.

Thus with the preferred embodiment, first, the simultaneous generation of different types of reconstructed data sets out of a single acquisition run occurs. Second, the simultaneous rendering of two (or more) of these data sets, on top of each other, but with different rendering settings, is provided for.

The dual rendering of the preferred embodiment allows the user to retrieve several types of information from a single acquisition run. One has the advantage of being able to display image information, which is shown in four volume data sets that are generated separately (native mask, native fill, subtracted, and enhanced reconstruction as in the prior art).

Figure 9:
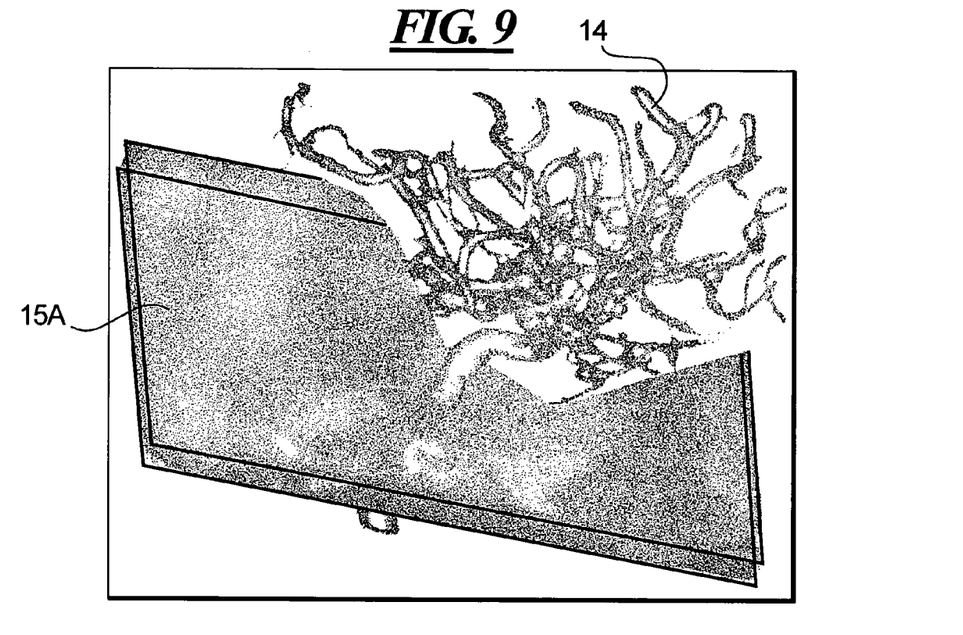
FIG. 9 shows, according to the preferred embodiment, a dual volume display of a sub-volume (vessels) and of an enhanced contrast data set (MPR display)

These volumes are displayed as described in prior art FIGS. 3, 4, 5, and 6. With the preferred embodiment, however, a user can also display different information parts simultaneously with different colors and with different transparencies overlaying two visualizations (FIGS. 7, 8, and 9). A modification of the color and transparency values allows the user to show or hide parts of the 3-D data sets dynamically without big editing efforts as in the prior art. Finally, in FIG. 9, there is an example for a dual rendering with an enhanced reconstruction (sub and enhanced). Also here it is preferable to select the type and the rendering settings for both data sets separately.

The user gets more information to orientate himself via anatomic and topological details and he can easily hide parts he is not interested in.

The concept of dual rendering involves:
1. Two cubes.
2. For each cube the settings i), ii) . . . etc. may be completely different.
3. On the monitor one shows an image that is generated by sending virtual rays through cube 1 with first set of settings AND cube 2 with a second set of settings simultaneously. This is more difficult than just adding two 2-D views. Example: Opacity of cube 1 may make it impossible to see the contributions of cube 2 (example: the bones cover the vessels).

As an analogy the following is helpful. The computation of a glass animal sitting in a glass house would also be a dual volume rendering.

The extended algorithm for ray casting using multiple volumes (dual rendering) is as follows:

for each image pixel $\rho$
  set initial color of pixel to black: $c_\rho := 0$
  for each voxel $v_{\rho i}$ belonging to pixel $\rho$
    for each volume j
      calculate the color value $c(v_{\rho i}, j)$ originating from voxel $v_{\rho i}$ in volume j
      determine opacity $o(v_{\rho,j})$ within a range 0 . . . 1
    end
    for all volumes j in ascending order of opacities $o(v_{\rho i}, j)$ $$c_\rho := cp(1 - o(v_{\rho i}, j)) + c(v_{\rho i}, j) o(v_{\rho i}, j)$$

end
  end
end

As shown in FIGS. 7 and 8, with the fading (blending) tool 16 with slider 16A, a dual-volume property's window is provided by which image a and image b may be volume blended (faded) such as in a percentage from 0 to 100 percent with slider 16A (0 is in the middle with a positive percent to the right and a negative percent to the left). Thus in FIG. 7, the bone 13A relative to the vessels 14 has a stronger appearance whereas in FIG. 8 the bone 13B has a lesser appearance compared to the vessels 14.

In FIG. 9, a dual volume display is provided with an enhanced contrast data set for the bone portion 15 taken from FIG. 6.

In summary, with the dual rendering of the preferred embodiment, in the first example shown in FIGS. 7 and 8, the native mask (FIG. 3) as a first reconstruction and the fill mask (FIG. 4) as a second reconstruction are provided. Those two volumes are blended with the appropriate fading being chosen between the two images.

As a second example, the first reconstruction could be enhanced, and the second reconstruction could be subtracted.

In a third example, the first reconstruction could be native fill and the second reconstruction can be subtracted.

In other words, for the four different types of reconstruction, any two of them can be combined for the dual volume rendering.

Figure 10:
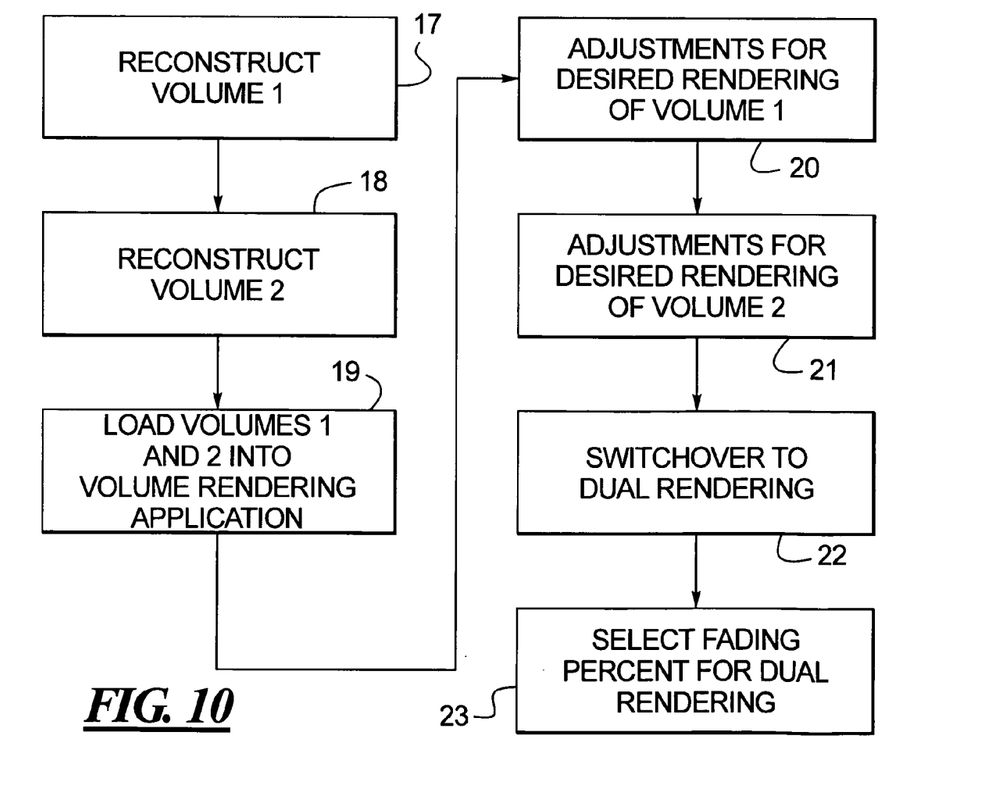
FIG. 10 shows a flowchart of a method of a preferred embodiment for a dual rendering of images.

FIG. 10 summarizes the method steps involved. In the first step 17, volume 1 is reconstructed. In a second step 18 volume 2 is reconstructed. As described previously, a simultaneous generation of different types of reconstructed data sets out of a single acquisition run may be employed. Thus steps one and two may be simultaneous. In third step 19 both volumes are loaded into the volume rendering application in the computer. In fifth step 20, adjustments are made for a desired (pleasing) rendering of volume 1. In fifth step 21, adjustments are made for a desired (pleasing) rendering of volume 2. In sixth step 22, viewing on the computer screen is switched over to dual rendering. In seventh step 23, as described above with reference to window 16, the fading percent is selected for the dual rendering. The seventh step determines an extent to which one volume can be seen through the other volume.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for dual rendering of medical images of a portion of a human anatomy having bone structure and vessel structure, comprising the steps of:

a computed tomography x-ray scanning of said portion of the human anatomy without injected dye to generate a plurality of 2D projection native mask images showing the bone structure but not the vessel structure;

a computed tomography x-ray scanning of said portion of the human anatomy with injected dye to generate a plurality of 2D projection native fill images showing both the bone structure and the vessel structure;

subtracting the native mask images showing the bone structure from the native fill images showing the bone structure and the vessel structure to create 2D projection subtracted images showing the vessel structure but not the bone structure;

in a first computed tomography reconstruction process, from said 2D projection subtracted images using a computer to create a subtracted 3D data volume comprising a plurality of voxels for showing the vessel structure but not the bone structure;

in a second computed tomography reconstruction process, from said 2D projection native mask images using the computer to create a native mask 3D data volume comprising a plurality of voxels for showing the bone structure but not the vessel structure, and adjusting an opacity of the voxels of the native mask 3D data volume to a desired opacity to allow viewing portions of the vessel structure through the bone structure; and in a dual volume image rendering process, using both the native mask 3D data volume and the subtracted 3D data volume to create on a same 2D computer monitor a volume image of the vessel structure and a volume image of the bone structure in register with one another but where portions of the vessel structure can be seen through the bone structure based on said adjusted desired opacity.

2. A method of claim 1 wherein said native mask images and said native fill images are obtained in a single x-ray scanning acquisition run wherein said dye is injected during said single acquisition run.

3. A method of claim 1 wherein said opacity is set by a volume blending slider.

4. A method for dual rendering of medical images of a portion of a human anatomy having bone structure, low contrast structure comprising at least one of a tumor or a bleeding, and vessel structure, comprising the steps of:
- a computed tomography x-ray scanning of said portion of the human anatomy without injected dye to generate a plurality of 2D projection native mask images showing the bone structure and the low contrast structure but not the vessel structure;
- a computed tomography x-ray scanning of said portion of the human anatomy with injected dye to generate a plurality of 2D projection native fill images showing the bone structure, the low contrast structure, and the vessel structure;
- subtracting the native mask images showing the bone structure and the low contrast structure from the native fill images showing the bone structure, the low contrast structure, and the vessel structure to create 2D projection subtracted images showing the vessel structure but not the bone structure and the low contrast structure;
- in a first computed tomography reconstruction process, from said 2D projection subtracted images using a computer to create a subtracted 3D data volume comprising a plurality of voxels for showing the vessel structure but not the bone structure;
- in a second computed tomography reconstruction process, from said 2D projection native mask images using the computer to create an enhanced 3D data volume comprising a plurality of voxels for showing the low contrast structure but not the vessel structure, and adjusting the voxels of the enhanced 3D data volume to a desired opacity to allow viewing portions of the vessel structure through the low contrast structure, or adjusting the opacity of some of the voxels to hide those voxels to allow viewing portions of the vessel structure through a removed portion of the low contrast structure corresponding to said hidden voxels; and
- in a dual volume image rendering process, using both the enhanced 3D data volume and the subtracted 3D data volume to create on a same 2D computer monitor a volume image of the vessel structure and a volume image of the low contrast structure in register with one another, but where portions of the vessel structure can be seen through the low contrast structure based on said adjusted desired opacity or where portions of the vessel structure can be seen where said portion of the low contrast structure has been removed based upon said hiding of some of the voxels.

5. A method of claim 4 wherein said native mask images and said native fill images are obtained in a single x-ray scanning acquisition run wherein said dye is injected during said single acquisition run.

6. A method of claim 4 wherein said opacity is set by a volume running slider.

\* \* \* \* \*